United States Patent [19]
Sauter et al.

[11] Patent Number: 5,488,682
[45] Date of Patent: Jan. 30, 1996

[54] POLYMER BASED OPTICAL CONNECTOR

[75] Inventors: Gerald F. Sauter, Eagan; Rick C. Stevens, Apple Valley, both of Minn.

[73] Assignee: Unisys Corporation, Blue Bell, Pa.

[21] Appl. No.: 270,984

[22] Filed: Jul. 5, 1994

[51] Int. Cl.⁶ .................................... G02B 6/32
[52] U.S. Cl. .................. 385/53; 385/24; 385/35; 385/89; 385/49
[58] Field of Search ............... 385/24, 33, 31, 385/35, 49, 53, 88–91, 129, 130

[56] References Cited

U.S. PATENT DOCUMENTS

| | | | |
|---|---|---|---|
| 4,711,521 | 12/1987 | Thillays | 385/93 |
| 4,744,617 | 5/1988 | Hvezda et al. | 385/24 |
| 5,224,184 | 6/1993 | Boudreau | 385/35 |
| 5,245,680 | 9/1993 | Sauter | 385/24 |
| 5,357,590 | 10/1994 | Auracher | 385/33 |

*Primary Examiner*—John D. Lee
*Attorney, Agent, or Firm*—John B. Sowell; Mark T. Starr; Charles A. Johnson

[57] ABSTRACT

A novel optical connector of the type useful for interconnecting operational modules comprises a polymer backplane for supporting a plurality of polymer waveguides on a formable substrate. Each said waveguide is provided with a receiving end and a transmitting end. Each end is precisely located juxtaposed a spherical ball lens located in a precision recess formed in the lower cladding layer of said substrate. A housing comprising a transparent window is mounted opposite each ball lens. In one form a plurality of window connectors extends transversely from a backplane substrate to provide a high speed optical data bus.

11 Claims, 5 Drawing Sheets

POLYMER BASED OPTICAL CONNECTOR

BACKGROUND OF THE INVENTION

1. Field of the Invention

The present invention relates to an optical connector for optical wave guides and/or optical fibers. More particularly the present invention relates to a novel high speed optical data bus comprising an optical backplane and a plurality of novel optical connectors.

2. Description of the Prior Art

When optoelectronic conductors are employed in various hardware devices such as connectors, terminal devices and converters, they usually employ Free Space Optical Interconnectors. Any time light is transmitted in free space, it should be transmitted as collimated light, otherwise the light is being diverged or converged. Light being diverged from a point source or converged to a point source has a fixed focal point which in most light conducting systems becomes critical for the efficient transfer of light in free space. It was known heretofore that adapters and connectors employing optical fibers could be designed to eliminate critical focus in systems designed as afocal interconnection systems.

Fiber optic and wave guide optical interconnections are classified in International Class GO2B 5/14 and 6/42 which generally corresponds to U.S. Class 85, Subclasses 53 to 94.

U.S. Pat. No. 4,711,521 shows and describes an afocal system which is incorporated into a terminal device. Light in a single strand optical fiber is mechanically positioned in an aperture of a diaphragm so that it is juxtaposed a micro sphere position on a light receiver or transmitting crystal which is electrically connectable to an electrical circuit. The "terminal device" comprises at least nine physical parts or elements which must be assembled using jigs and fixtures to complete the afocal system which is adapted to receive a single optical fiber.

U.S. Pat. No. 5,224,184 shows and describes a critical focus system in which a plurality of chips are interconnected by light fields. The chips to be interconnected are provided with optical ports for receiving or transmitting optical signals. Spacing between the ports is described as being 10 to 1,000 microns. Chips are placed on a rigid substrate with a positional accuracy of 7 to 20 microns on the substrate. Lenses are interposed between the ports on chips or at ports to be coupled to optical fibers or placed laterally (X,Y) to a positional accuracy of approximately plus or minus one-half micron. The coupling efficiency is described as being an average of 27% over an optical field width of 1,000 microns. Thus special jigs and fixtures as well as guides for lasers and detectors are employed to position and align both the lenses and the chips.

It would be desirable to provide an interconnection to interconnect the operating modules of a main frame computer via means of fiber optic cables. However, the complexity of the connectors available heretofore have introduced problems which mitigate against their use. Thus, it is the present practice in the main frame computer art to provide operational modules or printed circuit type cards provided with inconnecting pins which insert into a mother board to form a base computer system. Such mother boards have grown in complexity to require in excess of twenty separate layers comprising signal planes, insulating layers and ground planes. Attempts to provide miniature module cards and mother board have heretofore generated crosstalk at the higher frequencies, provided critical data paths whose lengths are mismatched and provided critical data paths having high attenuation and mismatched terminal impedance, all of which results in ringing, echoing and false data signals.

It would be highly desirable to provide a mainframe computing system with a miniaturized card set of modules which could be interconnected by an optical fiber motherboard which would completely eliminate the problems associated with laminated electrical connectors and conventional mother boards used in the mainframe computing systems.

SUMMARY OF THE INVENTION

It is a principal object of the present invention to provide an optical backplane having a plurality of optical connectors for interconnecting cards of modules of a computing system.

It is a principal object of the present invention to provide a novel optical backplane which connects to or is made integral with a plurality of optical polymer connectors.

It is a principal object of the present invention to provide a novel polymer optical connector.

It is a principal object of the present invention to provide a novel polymer backplane that is flexible and formable after manufacture.

It is a principal object of the present invention to provide an optical high speed data bus which virtually eliminates the need for massive multi-pin electrical connectors used for providing parallel data transmission in an attempt to achieve higher speed data transmission capability.

It is another object of the present invention to provide a low cost highly reliable, high speed data bus capable of transmitting multiple gigabytes of data for each optical channel.

According to these and other objects of the present invention, there is provided an optical high speed data bus having an optical backplane connected to a plurality of optical module connectors. Each of said connectors comprises a plurality of polymer wave guides formed on a low index of refraction cladding layer which is formed on a supporting substrate. A precision recess is formed in said cladding layer juxtaposed the transmitting and receiving ends of said wave guides. Collimating spherical ball lenses are mounted in said precision recesses opposite the end of the wave guide and windows are provided opposite the spherical ball lenses for purposes of connecting one connector to a second mating connector.

DETAILED DESCRIPTION OF THE PREFERRED EMBODIMENTS

Figure 1:
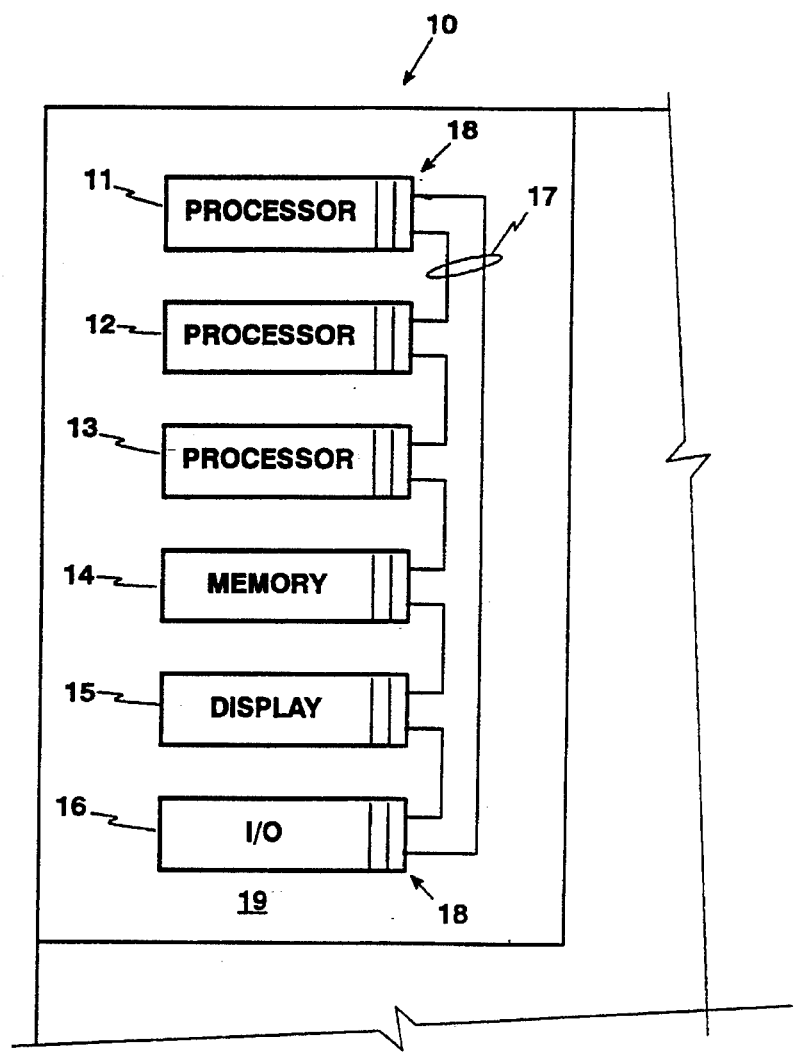
FIG. 1 is a schematic drawing showing the principal modules of a computer connected to an optical backplane which is mounted on or with a multi-layer mother-board.

Refer now to FIG. 1 showing a schematic drawing of the principal modules of a computing system 10. The computing system comprises a plurality of processors 11 to 13 which are connected to a main memory 14. The system also includes a display 15 and a plurality of I/O devices 16 all of which are interconnected by an optical high speed data bus 17. In the preferred embodiment of the present invention, the bus 17 is connected to the modules 11 through 16 by means of polymer connectors 18 to be described in greater detail hereinafter. The modules 11 to 16 are preferably connected into a mother-board 19 which is also provided with conventional electrical connectors. Such mother-boards have limitations of the speed of data transmission as well as reliability and maintainability which will be overcome with the optical high speed data bus 17 to be described in detail hereinafter.

Figure 2:
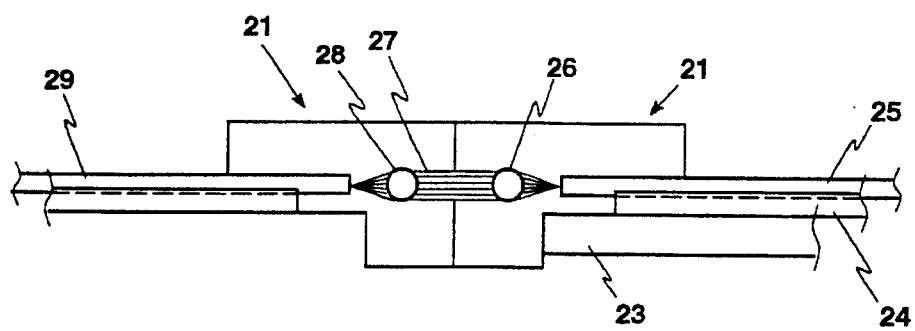
FIG. 2 is a schematic drawing in side elevation of a prior art adapter for connecting two optical fibers together.

Refer now to FIG. 2 showing a side elevation of a prior art connector or adaptor for connecting two optical fibers together. The connectors shown are of the robust optical connector (ROC) type made by AT&T. The ROC connector 21 comprises an interface housing 22 which is connected to a support member 23. The support member is shown positioning a silicon substrate 24 which has an etched V-groove therein. The V-groove in the silicon substrate provides a guide channel for positioning a single optical fiber 25 which presumably is positioned at a critical distance from a first spherical ball lens 26. The light from the single optical fiber 25 diverges and is transmitted as a collimated beam 27 to a second spherical ball lens 28 of a second ROC 21 which also has an output formed by converging light from the lens 28 onto the end of a second optical fiber.

Figure 3:
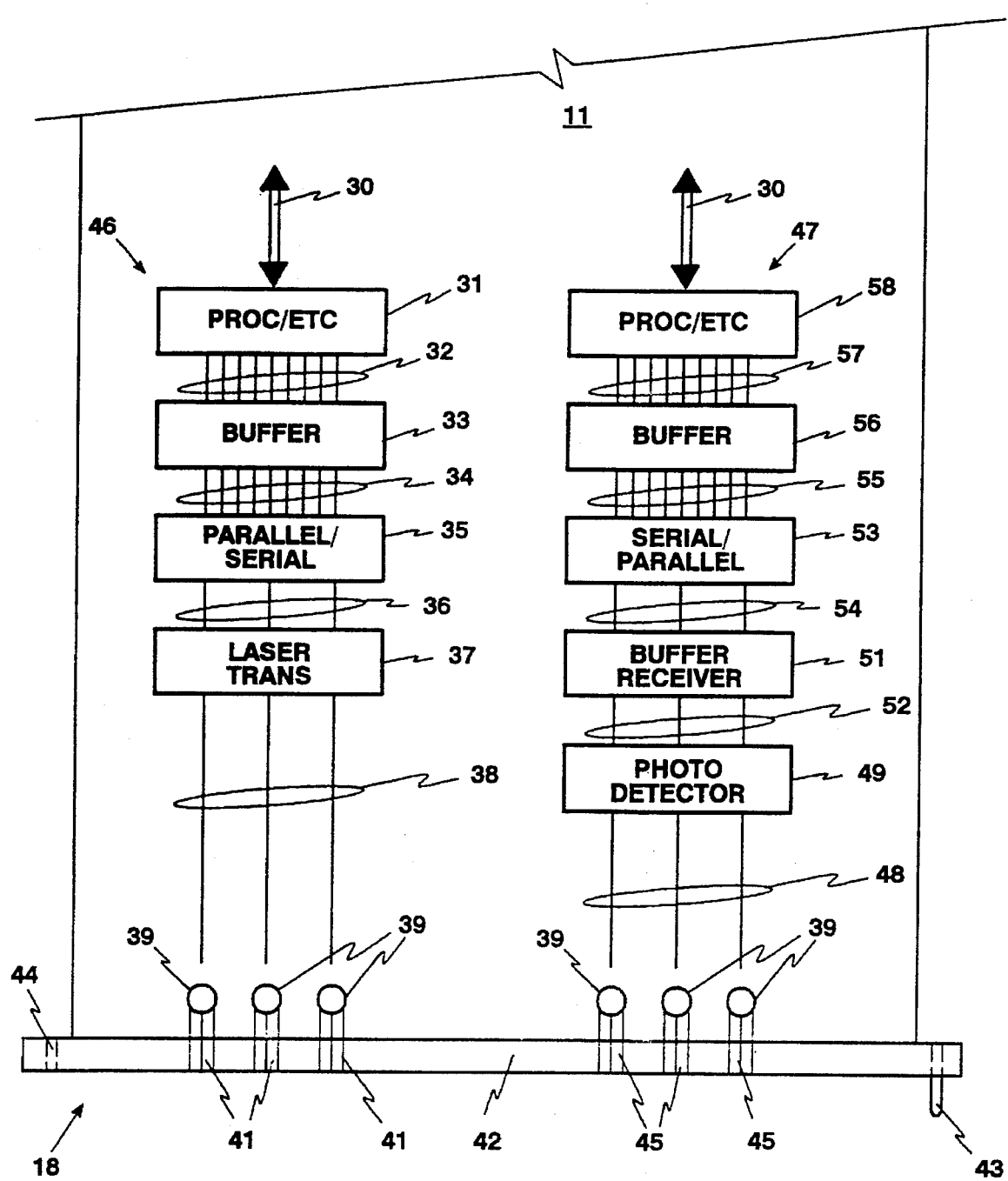
FIG. 3 is a schematic drawing of a transmitter/receiver of the type used on the module shown in FIG. 1 to provide a plurality of parallel light data paths at the mating connector interface.

Refer now to FIG. 3 showing a schematic drawing of a transmitter and receiver of the type which will be used in each of the modules 11 to 16 shown in FIG. 1. The data channel is shown starting at line 30 to a processor 31 in a processor module 11 which provides parallel outputs on lines 32 which are connected to a buffer 33. The output of the buffer 33 on parallel lines 34 is converted from parallel to serial form by the converter 35 which is shown having three serial output lines 36. The three serial output lines 36 are connected to a laser diode array transmitter 37 which provides three outputs that are coupled through the polymer wave guides 38. The polymer wave guides 38 each terminate at a precise position juxtaposed the three spherical ball lenses 39 each of which provides a beam of collimated light 41 which contains the high speed data. It will be understood that each of the polymer wave guides 38 is capable of performing at data rates which approach 18 gigabytes under present day technology which may be expanded in the near future. Thus, it is entirely possible that only a single polymer wave guide 38 would be required for most main frame computers. The collimated beam of light 41 is passed through the dust proof window 42 to a connector 18 on the optical high speed data bus 17 as shown in FIG. 1. The window 42 is provided with a male locating pin 43 and a recess 44 for positioning an interface of a similar connector so that the window of the similar connector aligns the collimated light beams 45 with the spherical ball lenses 46 of the receiver 47. It will be understood that when the ring architecture as shown in FIG. 1 is employed, the transmitters 46 of the module 11 are transmitted onto a cable 17 which connects to a receiver of the module 12 and the transmitter of the module 12 is connected by a high speed data bus 17 to the receiver of the module 13, etc. the last module in the ring is shown as an I/O module which has it transmitter connected by a long polymer type wave guide 17 to the receiver of the module 11. Thus, the beams of light 45 which are being received at module 11 are understood to have been generated at the transmitter of the module 16. The spherical ball lenses 46 converge the light beams 45 onto the ends of polymer wave guides 48 which are connected to a photodetector array 49. The output of the photodetector array 49 is shown coupled to a buffer receiver 51 via three lines 52 and the output of the buffer receiver 51 is coupled to a serial to a parallel converter 53 via three lines 54. The parallel output on lines 55 from converter 53 are applied to buffer 56 to provide a parallel output on lines 57 that connects to the processing unit 58 of the module 11.

Figure 4:
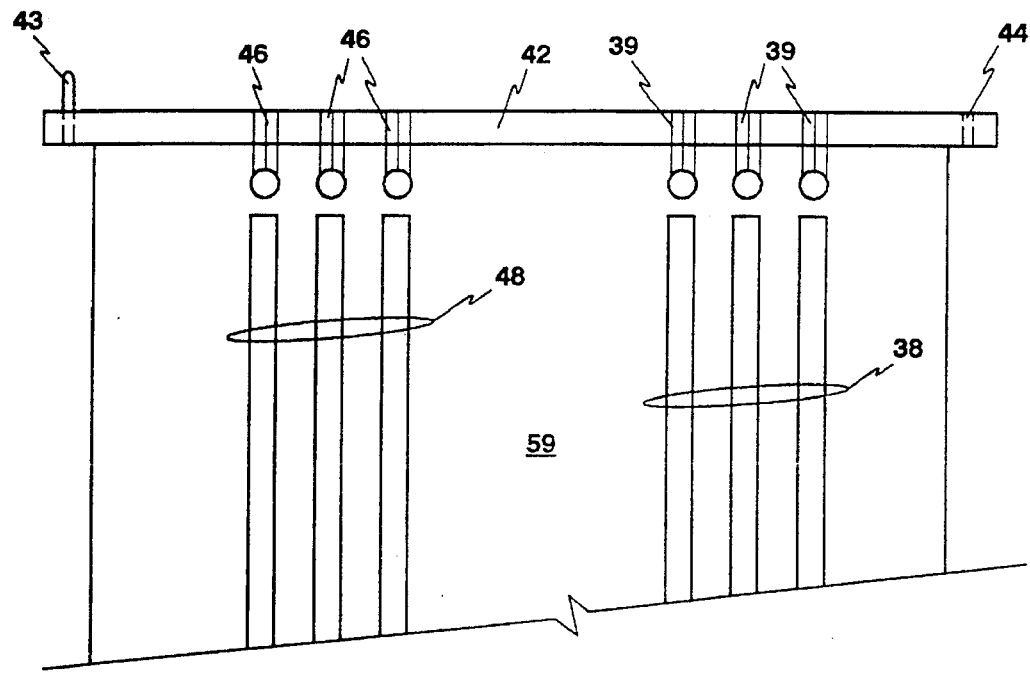
FIG. 4 is a schematic drawing of the basic elements of the present invention connector used for interconnecting mating connectors at their interface.
Figure 5:
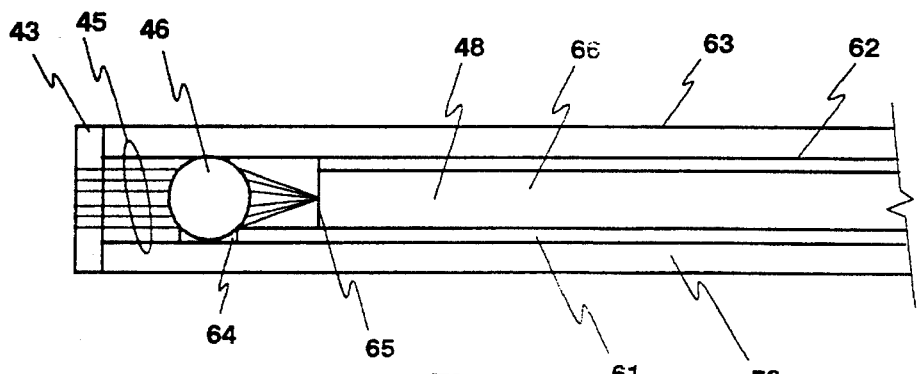
FIG. 5 is an enlarged schematic drawing in side elevation of the light emitting end of a wave guide of the present invention connector showing a collimating ball lens precisely located juxtaposed the end of the wave guide.

Refer now to FIG. 4 showing a plan view of the basic elements of the present invention connector and to FIG. 5 showing an enlarged side elevation in section taken through the connector of FIG. 4. The spherical ball lens 46 is shown receiving the beam collimated light 45 and converging it onto a polymer wave guide 48 which is supported by a substrate 59 having a cladding layer 61. For purposes of the present invention, it is possible to form the cladding layer 61 intregal with the substrate 59. The wave guide 48 is shown having a bottom cladding layer 61 and a top cladding layer 62 which are designed to confine the light to the wave guide 48. In the preferred embodiment of the present invention, the substrate 59 is made before the window 43 and its associated housing 63 and ball 46 are integrated with the system. The cladding layer 61 is shown etched to form a precision locating recess 64 which accepts and locates the spherical ball lens 46. The wave guide is next applied to the cladding layer 61 and is precision etched to form its light projecting end 65. Then the top cladding layer 62 is applied and etched to complete the top cladding layer 62. After making the cladded wave guide 48 and recess 64, the ball 46 may be applied by a precision instrument which also applies a slight amount of adhesive to the bottom of the spherical lens 46 to hold it in place. Adhesives may be used to connect the window 43 and housing 63 to the substrate 59.

Figure 6:
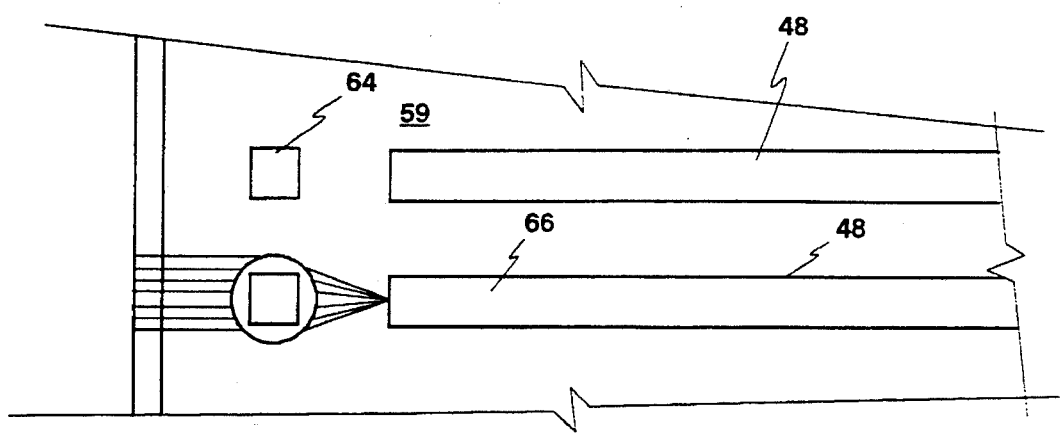
FIG. 6 is an enlarged schematic drawing in plan view of the wave guide shown in FIG. 5.

Refer now to FIG. 6 showing an enlarged schematic drawing in plan view of the waveguide shown in FIG. 5. The recess 64 is shown as a rectangle which may be etched to a precision depth so that the ball 46 is located with its exact center on the center line 66 of the waveguide 48.

Figure 7:
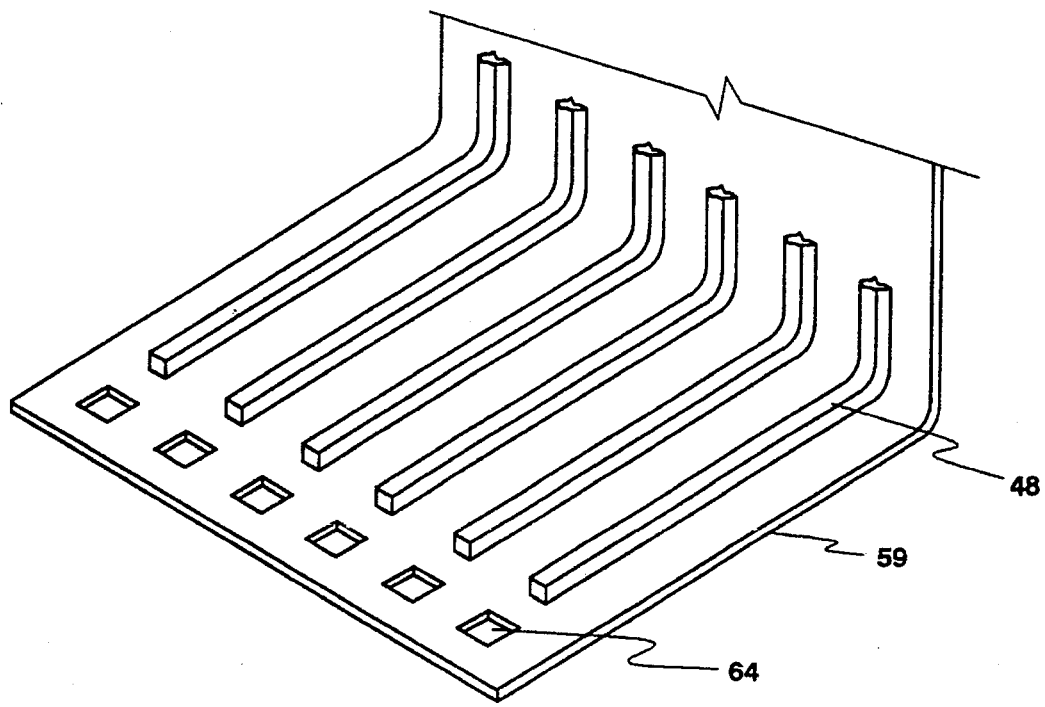
FIG. 7 is an enlarged isometric schematic drawing of a plurality of wave guides of the type shown in FIGS. 4 to 6 on a formable or flexible substrate.

Refer now to FIG. 7 showing an isometric drawing of a plurality of waveguides 48 of the type shown in FIGS. 4 to 6 mounted on or integrated to a formable and flexible substrate 59. Even though the connector shown in FIG. 7 has been formed after manufacture, the waveguides 48 maintain their exact and precise position relative to the recesses 64.

Further it will be understood that the waveguides 48 may be curved in the X, Y and Z plane. This also permits a waveguide or waveguides 66 to transmit light through waveguides 48 even though arranged in the same or different planes.

Another feature of the present invention is that the spherical ball lenses may be as small as 200 to 500 micrometers. Thus, the pitch between waveguides such as waveguides 48 should be approximately twice the diameter of the balls or 500 to 1,000 micrometers. The critical focus of the waveguide end 65 to the center of the spherical ball lens is approximately one-half of one micrometer. Thus, it will be appreciated that the semiconductor etching process performed by semiconductor masking will permit this amount of accuracy while still achieving very high yields of the connectors. The critical distance between balls on two connectors is approximately 5 millimeters ball to ball through the window 43. The windows 43 may be made from a microscope slide glass and need only be as long as approximately 12 millimeters to accommodate six waveguides 48. Thus, it will be understood that miniaturization of the connectors is easily achieved using the present invention connector.

Figure 8:
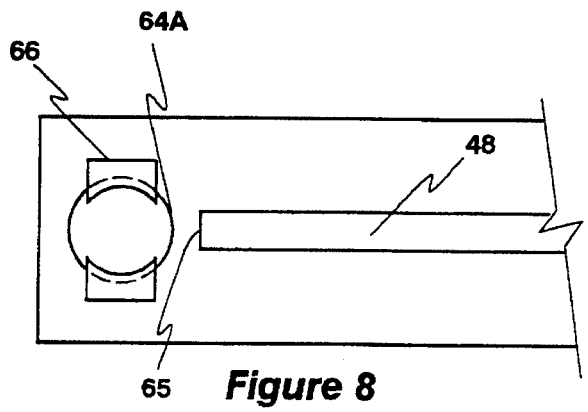
FIG. 8 is an enlarged detail plan view of a precision recess and snap in pocket for locating collimating ball lenses on a substrate.

Refer now to FIG. 8 showing an enlarged detail in plan view of a precision pocket 64A and a snap-in recess 66 which is made from the same material as the waveguide 48 and may be etched in the same step. The waveguide 64A may be made from the same material as a recessed pocket which assures greater lateral positioning accuracy.

Figure 9:
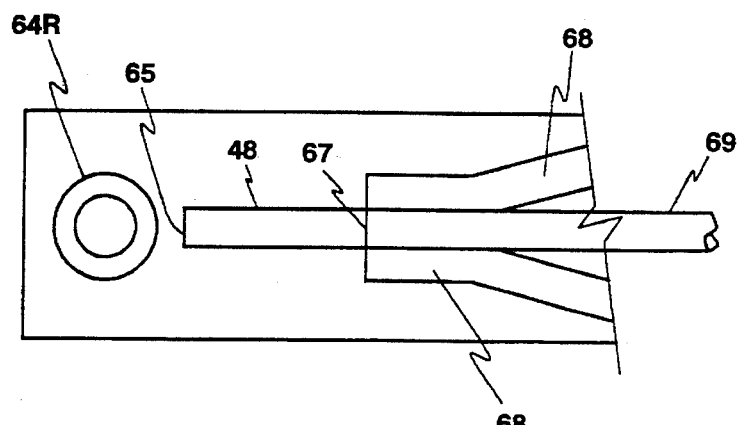
FIG. 9 is an enlarged detail of a round concave precision recess in a stub wave guide used to receive an optical fiber.

Refer now to FIG. 9 showing an enlarged detail of a round concave precision recess 64R which is positioned accurately opposite the N65 of a waveguide 48. The waveguide 48 also has a second end 67 which is adapted to receive the abutting end of an optical fiber 69 which is positioned by the funnel shaped waveguide material 68 formed at the same time as the waveguide 48. Thus, it will be understood that not only can the waveguide 48 serve to funnel light from or to a spherical ball lens, it may also be employed to form a connector or junction with an optic fiber 69.

Figure 10:
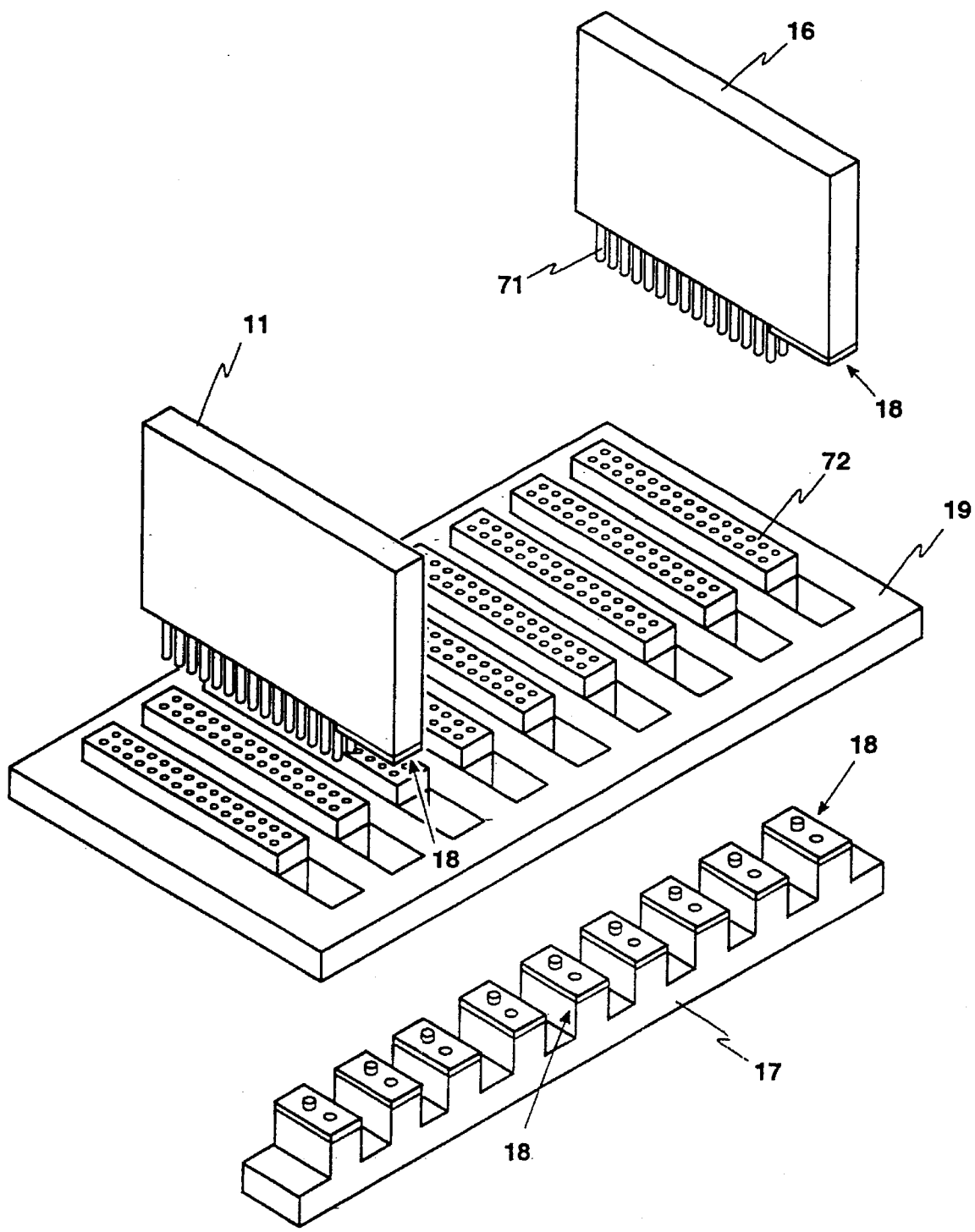
FIG. 10 is an isometric exploded drawing of a motherboard and a plurality of cards or modules containing functional elements and an optical high speed data bus which may be interconnected upon assembly into the motherboard.

Refer now to FIG. 10 showing an isometric exploded drawing of a mother-board 19 and a plurality of cards or modules 11 to 16. The plurality of cards contain functional elements as well as the optical high speed receivers and transmitters as described hereinbefore with reference to FIG. 3. Further, there is shown an optical high speed data bus 17 having a plurality of connectors 18 formed thereon. When the modules 11 to 16 are inserted into the mother-board, they are positioned by their male connector portions 71 which are inserted into the female connector 72. Thus, it will be appreciated that the optical high speed data bus 17 and its connectors are somewhat flexible to allow them to be positioned with a high degree of accuracy when they are inserted into the locating devices on the windows 42 of the connectors 18.

Having explained a preferred embodiment of the present invention, it will be appreciated that the mother-board 19 is of the multi-layer type which contains a plurality of signal lines and control lines which operate at low speed. Other low speed lines such as ground planes and power buses may also be located in the layers of the mother-board 19. However, when attempts are made to place high speed data lines and buses in the mother-board, problems arise such as cross-talk between lines impedance mismatching and ringing skew of data due to difference in line length. There is also a latency problem among other problems which are eliminated by the novel optical high speed data bus 17 and its connectors 18.

What is claimed is:

1. An optical connector of the type useful for interconnecting operational modules onto an optical backplane, comprising:

a backplane for supporting said optical connector, a low index of refraction layer on said backplane, a plurality of polymer waveguides formed on top of said low index of refraction layer, said waveguides having exposed light transmitting/receiving ends, a precision recess formed in said backplane juxtaposed each of said transmitting/receiving ends of said waveguides, collimating lens means mounted in each said precision recess opposite the ends of said polymer waveguides, light shielding means on top of said polymer waveguides, window means mounted on said backplane opposite said lens means, and said window means having positioning means thereon for indexing said optical connector relative to a mating optical connector.

2. An optical connector as set forth in claim 1 wherein said collimating lens means comprises spherical ball lens.

3. An optical connector as set forth in claim 2 wherein window means comprises a dust proof closure on the end of said optical connector.

4. An optical connector as set forth in claim 1 wherein said window means further comprises a plurality of windows, and polymer waveguides provided at predetermined positions along said backplane.

5. An optical connector as set forth in claim 4 wherein each said window means is further provided with coupling means for aligning said window means on said coupling means to window means on said operational modules.

6. An optical connector as set forth in claim 5 wherein said coupling means comprise guide pin means on said window means.

7. An optical connector as set forth in claim 1 wherein said optical connector comprises a plurality of transmitting waveguides and a plurality of receiving waveguides positioned on a backplane opposite window means on said operational module.

8. An optical connector as set forth in claim 7 wherein said backplane comprises a plurality of optical connectors, each said optical connector being movably mounted on said backplane and being adapted to be assembled to a mating window means on an operational module to provide an optical backplane data bus comprising a plurality of photolithographic aligned layers.

9. An optical backplane as set forth in claim 8 which further includes a plurality of fixed operational modules mounted in a mother-board;

each said operational module comprising receiving means and transmitting means positioned opposite collimating lens means and window means, and connector means on said optical connector window means on said backplane for aligning the collimating lens on said fixed operational module with the collimating lenses on said optical connectors on said optical backplane.

10. An optical backplane as set forth in claim 9 wherein said operational module further comprises stub fiber optic means for positioning an optic fiber opposite said waveguide and for connecting said operational module to said optical backplane.

11. A high speed optical data bus of the type used for connecting operational modules mounted on conventional mother-board carriers to each other, comprising:

a substrate forming a backplane for supporting a plurality of optical connectors, each said optical connector comprising, a first cladding layer comprising low index of refraction material on said substrate, a plurality of polymer waveguides precisely deposited relative to each other on said first cladding layer and provided with light emitting ends, a second cladding layer of low index of refraction material forming a shielding layer, lens positioning recesses located in said first cladding layer at a predetermined distance from the light emitting ends of said polymer waveguides, spherical ball lenses mounted in said recesses at precise predetermined positions from said light emitting ends of said polymer waveguides, and window means forming a closure over said spherical ball lenses and said light emitting ends of said waveguides, said spherical ball lenses being adapted to transmit/receive collimated light through said window means and to collimate light received from said light emitting ends of said polymer waveguides.

* * * * *